Dec. 15, 1942.  D. D. VECCHIOLA  2,304,973
PIPE HANGER
Filed March 25, 1942
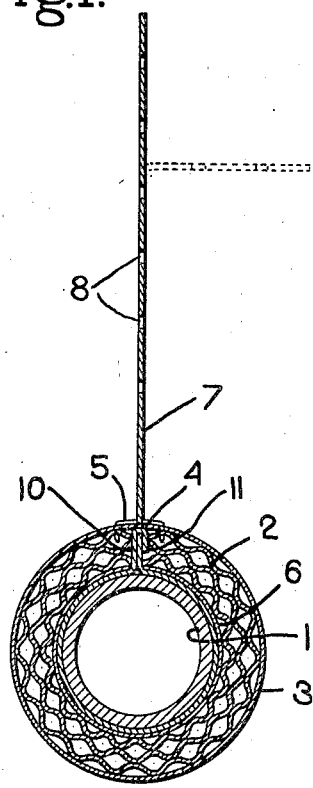
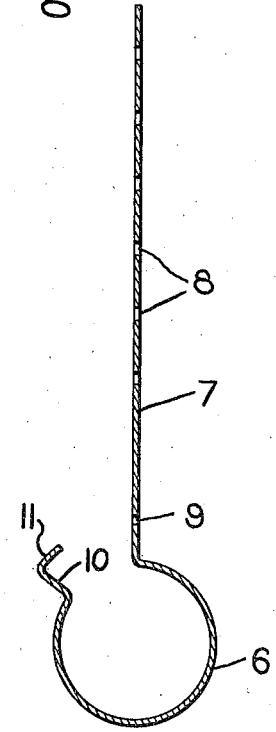
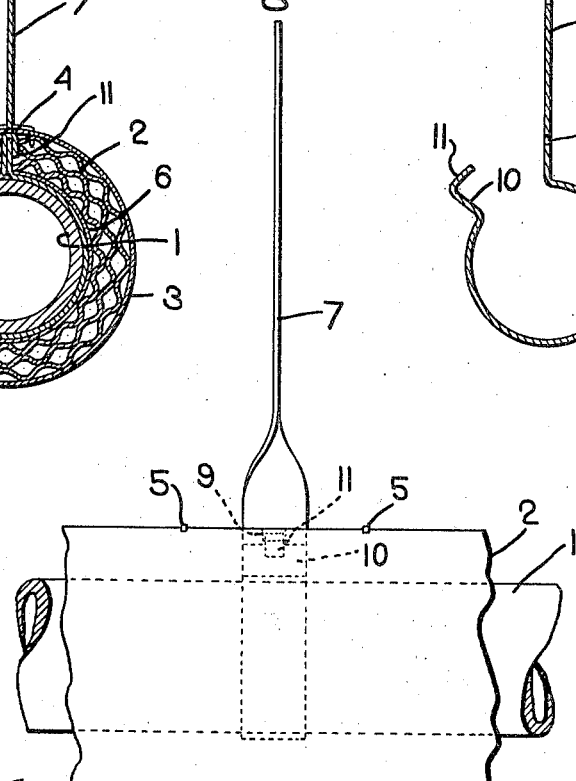
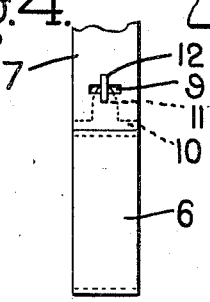
Inventor.
Davide D. Vecchiola
by Heard Smith & Tennant.
Attys.

Patented Dec. 15, 1942

2,304,973

UNITED STATES PATENT OFFICE 2,304,973

PIPE HANGER

Davide Danta Vecchiola, Quincy, Mass.

Application March 25, 1942, Serial No. 436,135

2 Claims. (Cl. 248—58)

This invention relates to improvements in pipe hangers and the principal object of the invention is to provide a one-piece pipe hanger having a section to embrace and preferably to fit the pipe, and a suspending section, and means for locking the loop section to the suspending section.

A further object of the invention is to provide a pipe hanger of the character described with a simple means for locking the loop section to the suspending section which desirably is of such character that the lock may be released when the hanger is removed for subsequent use.

More particularly the invention comprises a novel form of pipe hanger particularly adapted for use in suspending pipes having a covering of insulating material in which the means for locking the hanger upon the pipe will be obscured from view by the insulation.

This feature of the invention is of great importance for the reason that in many instances steam pipes and water pipes covered with insulation are so carried through a room as to be exposed to view and ungainly hangers employed which detract from the appearance of the room. Furthermore, many of the hangers employed are of such character as to expose substantial sections of the pipe thereby interfering with the efficiency of the insulation.

Where exposed pipes are thus employed they are desirably covered with cellular or other types of insulation which present smooth outer surfaces and are longitudinally slit in such manner as to enable them to be expanded for application to the pipe and then closed and secured in closed position by staples spanning the slit or by an overlapping layer of fabric which is adhesively secured to the underlying insulation.

An object of the present invention is to provide a hanger in which the supporting shank will extend from the pipe through the slit in the insulation without substantially interrupting its continuity when the insulation is closed upon the pipe and in which the means for locking the loop of the hanger to the shank will be wholly obscured from view by the insulation.

A further object of the invention is to provide a one-piece pipe hanger of the character described comprising a supporting shank having means by which it may be adjustably secured to a suitable support and provided with an expansible loop portion to permit the pipe to be inserted therein, with means for releasably locking the loop to the shank when the loop of the hanger is closed.

These and other objects and features of the invention will more fully appear from the following description and the accompanying drawing and will be particularly pointed out in the claims.

A preferred embodiment of the invention is illustrated in the accompanying drawing, in which, Fig. 1 is a vertical sectional view through a pipe surrounded by cellular insulation, a one-piece hanger applied to the pipe having a shank extending through the longitudinal slit in the insulation, and the means for locking the loop to the hanger enclosed within the insulation and illustrating in dotted lines the manner in which the shank of the hanger may be bent in angular relation to the longitudinal plane of the hanger to enable the shank to be secured to a horizontal support;

Fig. 2 is a detail longitudinal central view of the hanger;

Fig. 3 is a side elevation showing the hanger as applied to an insulated pipe as illustrated in Fig. 1, the shank of the hanger being bent at right angles to the axis of the loop; and, Fig. 4 is a detail view of the hanger illustrated in Fig. 2 showing a different means for locking the loop section to the shank of the hanger.

The construction shown in Figs. 1 and 3 illustrates a cylindrical pipe 1 surrounded by a cylindrical body 2 of cellular insulation having a smooth cylindrical finishing covering 3 secured thereto. In this construction the insulation is provided with a longitudinal radial slit 4 through the insulation which adapts the insulation to be spread sufficiently to enable it to be slipped over the pipe and then closed, the edges of the slit being secured together by suitable staples 5 spanning the slit. The hanger which is in one piece comprises a cylindrical loop section 6 which desirably closely fits the pipe, one end of the loop having a radial extension forming a shank 7 which desirably is provided with a plurality of suitable apertures 8 to receive nails or other devices for securing the hanger to a suitable support. The hanger desirably is in the form of a metal strap of rigid but bendable material which will enable the loop of the hanger to be expanded sufficiently to enable the loop thereof to be applied laterally to the pipe and then closed to fit upon the pipe. It also permits the shank to be bent at right angles, as illustrated in dotted lines in Fig. 1, so that it may be secured to a horizontal support, or may be bent to any other position according to the contour or location of the support.

The hanger is provided adjacent the loop with a preferably transverse slot 9 which desirably is located within the depth of the layer of insulation, as illustrated in Fig. 1. The opposite end of the loop is provided with an extension 10 adapted when the loop is closed to abut against the shank 9 and the extension is provided with a narrow end portion 11 adapted substantially to fit within and to be extended through the slot 9 and thereupon bent into contact with the opposite side of the shank 7, as illustrated in Fig. 1.

By reason of this construction the loop of the hanger is firmly locked upon the pipe and the lock wholly obscured from view by the insulation. The shank extends radially from the slit in the insulation and does not present an unsightly appearance.

A modified form of locking means is illustrated in Fig. 4 in which the narrow end portion of the extension 10 of the loop is T-shaped thereby providing a narrow stem and a relatively large head 12 adapted to be inserted through the slot 9 and thereupon bent at right angles to the plane of the extension 10.

Obviously the slot 9 in such construction could be made longitudinally of the shank and the end portion of the extension 11 suitably bent to permit its insertion through the slot and then bent to locking position.

It will be understood that the embodiment of the invention as shown and described herein is of an illustrative character and that various modifications may be made within the spirit and scope of the following claims particularly with respect to the means for locking the loop about the pipe and the manner in which the shank may be bent to adapt it to the support from which the pipe is to be suspended.

Having thus described the invention, what is claimed as new, and desired to be secured by Letters Patent, is:

1. A one-piece pipe hanger for a pipe having a cylindrical covering of preformed longitudinally slit insulation comprising a flat strap of rigid but bendable material having a loop section to fit the pipe and provided with a radial suspending shank having means to enable it to be secured to a suitable support and having a narrow slot in such proximity to said loop as to be within the thickness of said insulation, said loop having at its other end a radial extension provided with a narrow angularly bent end portion adapted to be inserted through said slot and bent into locking engagement with said shank.

2. A one-piece pipe hanger for a pipe having a cylindrical covering of preformed longitudinally slit insulation comprising a flat strap of rigid but bendable material having a loop section to fit the pipe and provided with a radial suspending shank having a plurality of spaced apertures to enable it to be adjustably secured to a suitable support and having a narrow slot in such proximity to said loop as to be within the thickness of said insulation, said loop having at its other end a radial extension provided with a narrow end portion bent at right angles to said extension adapted substantially to fit said slot and to be inserted therethrough and acting when bent in parallelism with and against said shank to provide a lock for said loop lying within and obscured by said insulation.

DAVIDE D. VECCHIOLA.